United States Patent [19]

Cohn et al.

[11] Patent Number: 4,463,068
[45] Date of Patent: Jul. 31, 1984

[54] FUEL CELL AND SYSTEM FOR SUPPLYING ELECTROLYTE THERETO WITH WICK FEED

[75] Inventors: J. Gunther Cohn, West Orange; Haim Feigenbaum, Highland Park; Arthur Kaufman, West Orange, all of N.J.

[73] Assignee: Engelhard Corporation, Iselin, N.J.

[21] Appl. No.: 430,155

[22] Filed: Sep. 30, 1982

[51] Int. Cl.³ ............................................. H01M 8/04
[52] U.S. Cl. ..................................... 429/34; 429/38; 429/72
[58] Field of Search ...................... 429/34, 38, 39, 41, 429/13, 51, 80, 72, 44

[56] References Cited

U.S. PATENT DOCUMENTS

| | | | |
|---|---|---|---|
| Re. 25,913 | 11/1065 | Solomon et al. | 429/116 |
| 2,969,315 | 1/1961 | Bacon | 204/284 |
| 3,160,527 | 12/1964 | Hess | 429/41 |
| 3,223,556 | 12/1965 | Cohn et al. | 429/34 |
| 3,251,718 | 5/1966 | Hilton | 429/41 |
| 3,300,343 | 1/1967 | Huber et al. | 429/34 |
| 3,441,442 | 4/1969 | Bushnell et al. | 429/34 |
| 3,467,552 | 9/1969 | Giner | 429/41 |
| 3,479,225 | 11/1969 | Chodosh et al.429 | 28/ |
| 3,481,737 | 12/1969 | Siebemberg et al. | 429/41 |
| 3,554,809 | 1/1971 | Craft | 429/13 |
| 3,634,139 | 1/1972 | Reiser | 429/24 X |
| 3,779,811 | 12/1973 | Bushnell et al. | 429/26 |
| 3,867,206 | 2/1975 | Trocciaola et al. | 429/35 |
| 3,905,832 | 9/1975 | Trocciaola | 429/39 |
| 3,954,502 | 5/1976 | Symons et al. | 429/39 |
| 3,981,749 | 9/1976 | Fukuda et al. | 429/41 |
| 4,035,551 | 7/1977 | Grevstad | 429/44 |
| 4,038,463 | 7/1977 | Lamarine et al. | 429/44 |
| 4,064,322 | 12/1977 | Bushnell et al. | 429/41 |
| 4,115,627 | 9/1978 | Christner et al. | 429/44 |
| 4,185,145 | 1/1980 | Breault | 429/34 |
| 4,219,611 | 8/1980 | Breault | 429/13 |
| 4,311,771 | 1/1982 | Walther | 429/51 |
| 4,366,211 | 12/1982 | Pollack | 429/38 |

Primary Examiner—Anthony Skapars

[57] ABSTRACT

An electrolyte distribution and supply system for use with a fuel cell having a means for drawing electrolyte therein is formed by a set of containers of electrolyte joined to respective fuel cells in a stack of such cells. The electrolyte is separately stored so as to provide for electrical isolation between electrolytes of the individual cells of the stack. Individual storage compartments are coupled by tubes containing wicking fibers, the ends of the respective tubes terminating on the means for drawing electrolyte in each of the respective fuel cells. Each tube is heat shrunk to tightly bind the fibers therein.

12 Claims, 10 Drawing Figures

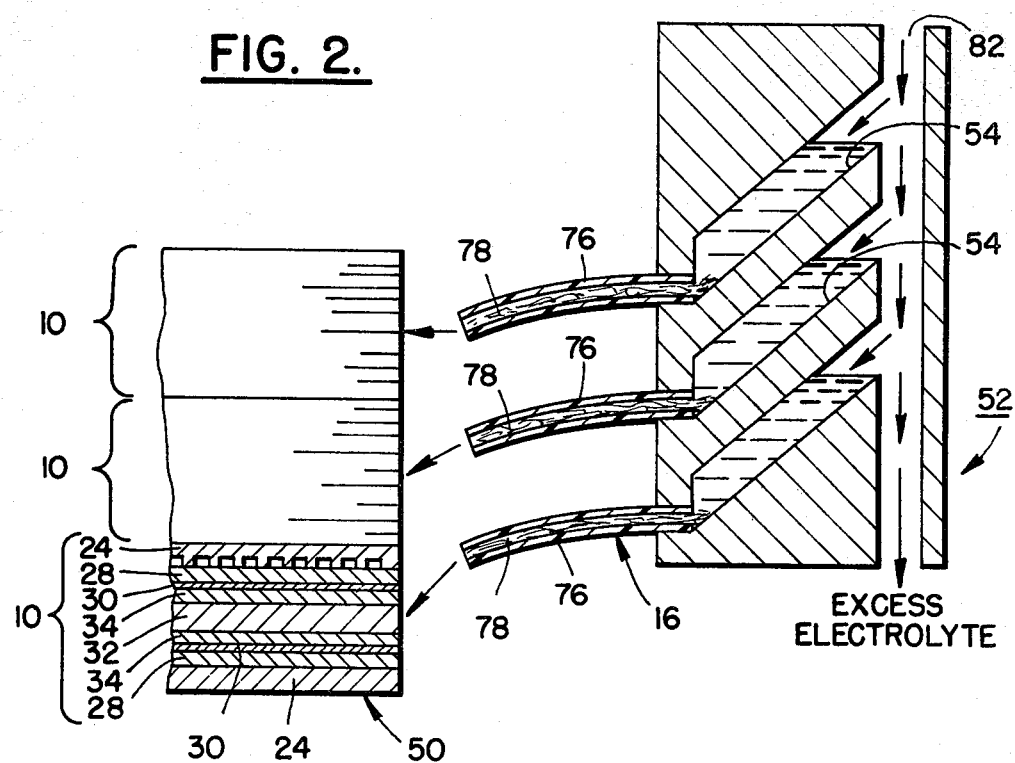
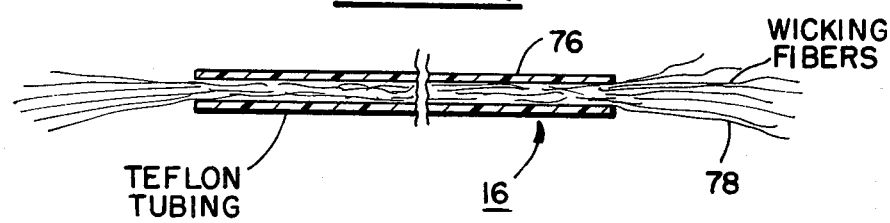
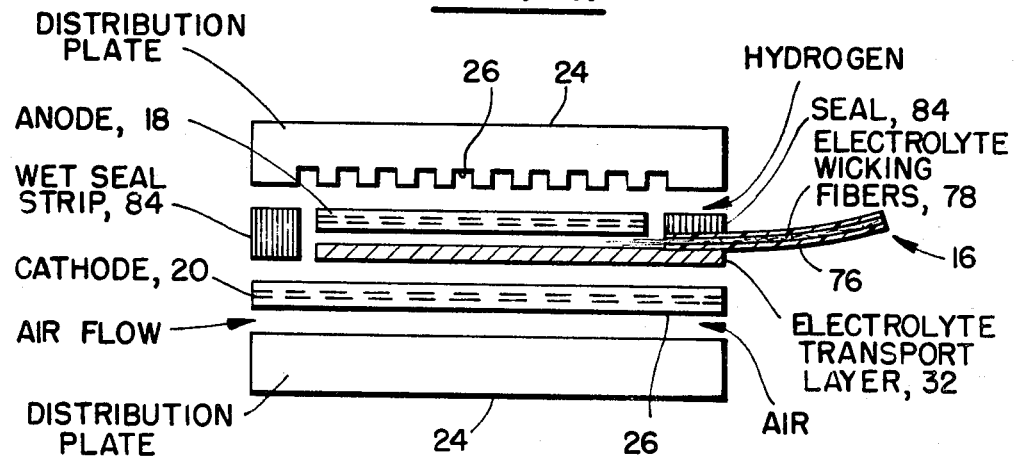

FUEL CELL AND SYSTEM FOR SUPPLYING ELECTROLYTE THERETO WITH WICK FEED

BACKGROUND OF THE INVENTION

The Government has rights to this invention pursuant to Contract No.: NASA DEN 3-241.

Reference is hereby made to other related patent applications which are assigned to the same assignee as the present application; application of O. Adlhart entitled "Fuel Cell With Multiple Porosity Electrode Matrix Assembly", Ser. No. 430,143, filed on Sept. 30, 1982; application of H. Feigenbaum entitled "Fuel Cell With Electrolyte Feed System", Ser. No. 430,156, filed on Sept. 30, 1982; application of O. Adlhart and H. Feigenbaum entitled "Fuel Cell and System For Supplying Electrolyte Thereto", Ser. No. 430,144, filed on Sept. 30, 1982; and application of H. Feigenbaum entitled "Fuel Cell and System For Supplying Electrolyte Thereto Utilizing Cascade Feed", Ser. No. 430,145, filed on Sept. 30, 1982.

This invention relates to a fuel cell having electrodes with an electrolyte supporting structure interposed therebetween for the drawing of electrolyte into interaction regions at the electrodes for electrochemical reactions with gaseous reagents and, more particularly, to an electrolyte supply system coupled to said electrolyte support structure wherein the electrolyte is drawn from the electrolyte supply system to the support structure.

Much research is being done in the area of fuel cell technology in order to provide ever increasing amounts of electric power and for operating such cells over longer periods of time without any need for shutdown to accomplish maintenance. As compared to other methods of generation of electric power from combustible fuels, a fuel cell has higher efficiency and is also characterized by a simplicity of physical structure in that such cells can be constructed without any moving parts.

While a variety of electrochemical reactions are known for the conversion of fuel into electricity without the direct burning of such fuels, one well-known form of cell utilized the reaction between oxygen and hydrogen, the hydrogen serving as the fuel. One common form of construction for the hydrogen-oxygen cell is the laminated structure wherein the electrodes are spaced apart by a porous layer of material which holds an electrolyte. For example, the electrolyte may be a concentrated phosphoric acid. The hydrogen is guided by passageways behind the active region of the anode and the oxygen is guided by passageways behind the active region of the cathode. At the anode, the hydrogen gas dissociates into hydrogen ions plus electrons in the presence of a catalyst, typically a precious metal such as platinum or platinum with other metals. The hydrogen ions migrate through the electrolyte to the cathode in a process constituting ionic current transport while the electron travels through an external circuit to the cathode. In the presence of a catalyst at the cathode, the hydrogen ions, the electrons, and molecules of oxygen combine to produce water.

In order to provide for the physical placement of the respective reactants at catalyst layers of the anode and cathode, layers of materials having hydrophilic and hydrophobic properties are disposed in an arrangement contiguous to the catalyst layers. They permit the electrolyte and the oxygen at the cathode and the hydrogen at the anode to contact the catalyst layer. The hydrophobic material is provided with pores of sufficiently large size to permit the gaseous hydrogen and the gaseous oxygen to freely flow through the material so as to come into contact with the catalyst.

Details in the construction of fuel cells, and in the component parts thereof, are disclosed in the U.S. Pat. Nos. 3,453,149 of Adlhart and 4,064,322 of Bushnell. These two patents show structures guiding the gaseous reactants into the regions of the catalyst. In addition, the Bushnell patent shows space within a cell for the storage of electrolyte so as to compensate for any changes in the quantity of electrolyte available for ion transport. An assembly for combining together a plurality of fuel cells in a single power source is disclosed in U.S. Pat. 4,175,165 of Adlhart. This patent also shows a manifold for the simultaneous feeding of the reactant gases to the cathode and the anode of the respective cells. The foregoing three patents are incorporated in their entirety by reference.

A problem arises during the operation of a fuel cell in that the cell has electrolyte losses. For instance, as a result of electrolyte volume changes, such as those due to temperature and composition changes, electrolyte can be driven out of the matrix and be permanently lost from use within the matrix. Thus, depending on the amount of such storage capacity, there is a limitation on the length of time during which the fuel cell can be operated before shutdown for maintenance. Such maintenance includes the replenishment of the amount of electrolyte in the requisite concentra- tion.

A further problem arises in the complexity of the structure required to lead the electrolyte in from a region of storage into the region of electrochemical activity alongside the layers of the catalyst. Such electrolyte leadin structures are described in the foregoing Bushnell patent. In particular, it is noted that such structures tend to increase the size of the cell, to increase resistance losses associated with the flow of electric current, and to decrease the surface area available for the electrochemical reactions.

Yet another problem is the supplying of electrolyte to such a fuel cell in a manner in which it can be absorbed by the cell and at such rate as may be necessitated by the loss of electrolyte during the operation of the cell.

SUMMARY OF THE INVENTION

The foregoing problems are overcome and other advantages are provided by a fuel cell and a system for supplying electrolyte thereto, both the cell and the supply system being fabricated in accordance with the invention. The cell is constructed with an electrolyte supporting structure having a means to draw and distribute electrolyte therein and the supply system is constructed so as to make electrolyte available to the cell at such rates as may be required. The fuel cell comprises a laminated structure wherein the electrodes are spaced apart by a layer of porous material. In a preferred embodiment of the invention, the porous material is provided as a matrix assembly having a central layer of relatively large pores.

In accordance with the invention, the supply system is provided with a capillary feed, preferably wherein cups or troughs are provided at different elevations corresponding to the elevations of respective ones of the cells in a stack of such cells in fuel cell power supply. A pumping means is provided for pumping electrolyte up into the respective troughs. A system of tubes is provided wherein each tube includes a wicking element for drawing the fluid of the electrolyte by capillary action from the storage trough to the electrolyte matrix assembly of the respective cells. The rate of flow of electrolyte into the cell is controlled by the wicking action of the electrolyte supporting structure in each cell. Alternatively, the cups or troughs need not be elevated but merely rely upon the capillary action of the wicking element.

BRIEF DESCRIPTION OF THE DRAWINGS

The foregoing aspects and other features of the invention are explained in the following description taken in connection with the accompanying drawing wherein:

FIG. 2 is a diagrammatic view shown in section of a feed system in accordance with the invention wherein the electrolyte is conveyed by wicking fibers to a fuel cell, such as the cell of FIG. 1;

FIG. 3 is a diagrammatic view of the wicking fibers of FIG. 2 extending from tightly fitting tube;

FIG. 4 is a diagrammatic view of a fuel cell, such as the cell of FIG. 1, showing the interconnection of an electrolyte wicking fiber to an electrolyte supporting member of the cell;

DETAILED DESCRIPTION OF THE INVENTION

Figure 1:
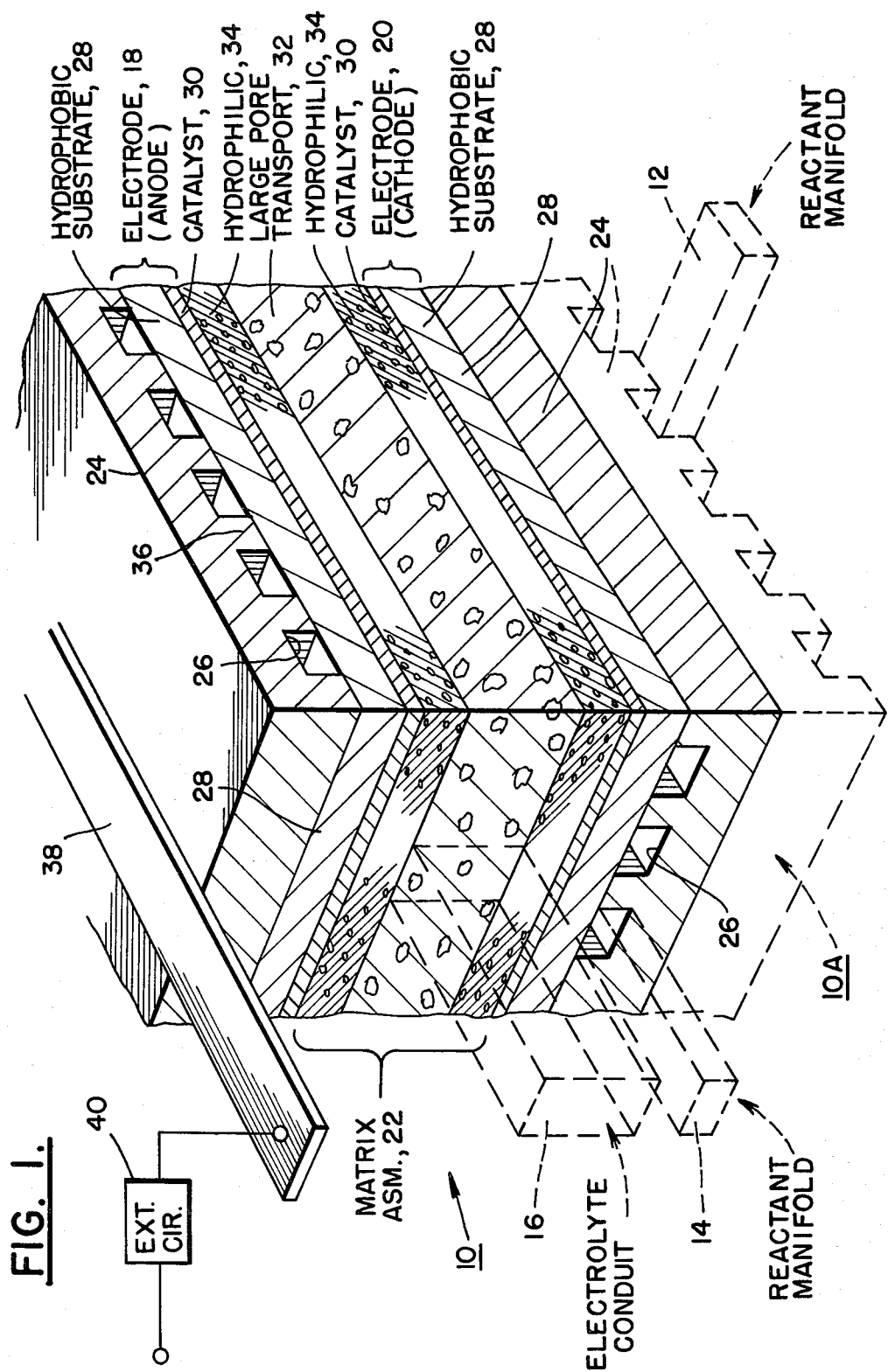
FIG. 1 is a perspective view of a portion of a stack of fuel cells in an assembly of such fuel cells, the portion comprising one complete fuel cell with a second cell being partially shown in phantom and the fuel cell being sectioned to identify the individual layers thereof.
Figure 5:
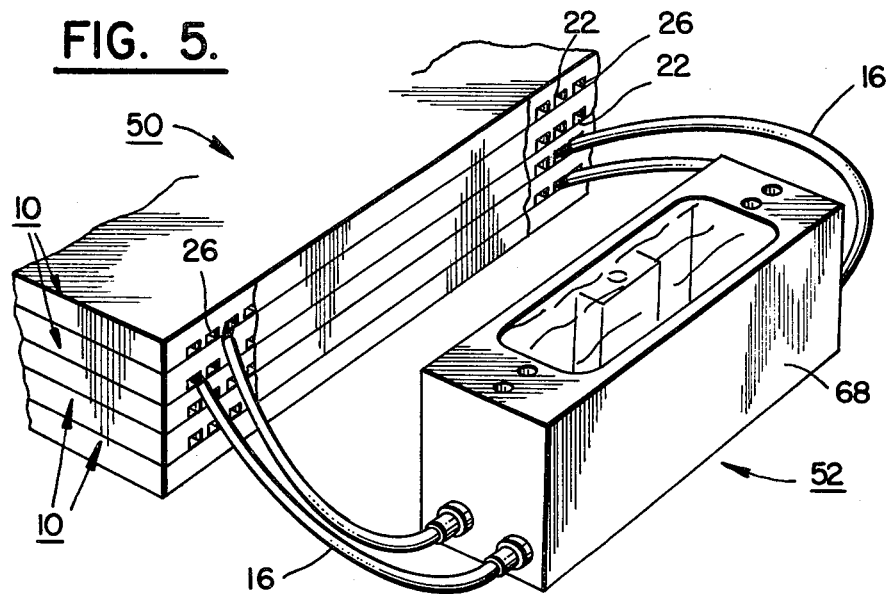
FIG. 5 is a perspective view of one embodiment of a system for supplying electrolyte to fuel cells in the stack.
Figure 6:
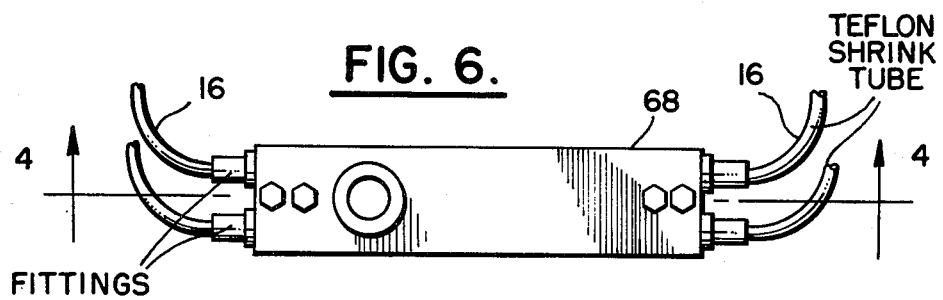
FIG. 6 is a top view of a portion of the manifold shown in FIG. 5.
Figure 7:
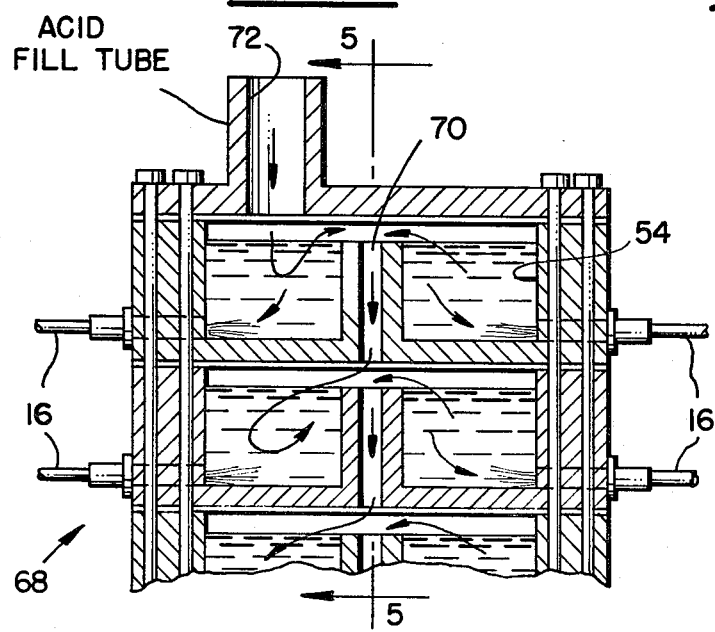
FIG. 7 is a sectional view of a portion of the manifold taken along line 4-4 in FIG. 6.
Figure 8:
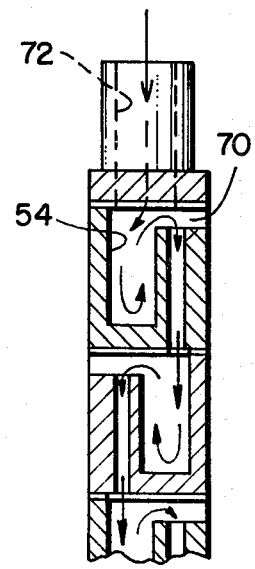
FIG. 8 is a sectional view of a portion of the manifold taken along line 5-5 of FIG. 7.

In FIG. 1, a fuel cell 10 is shown in perspective view. A part of a second fuel cell 10A, having the same construction as the cell 10, is shown in phantom and is placed contiguous to the cell 10 as would be the case if the cell 10 is understood to be one of many such cells which would ordinarily be placed in a stack (not shown). Connections of the cells 10 and 10A via manifolds for the conveyance of reactants and via conduits for the conveyance of electrolyte are shown schematically. Two such representative manifolds are shown; a manifold 12 for the conveyance of hydrogen to the anode of respective cells of the stack and a manifold 14 for the conveyance of oxygen to the cathode of respective cells of the stack. A set of electrolyte conduits 16 (only one of which is shown) conveys electrolyte to the respective cells of the stack. Although manifolds 12 and 14 are shown in a representative fashion in FIG. 1, it is understood that a single manifold for each reactant running generally along the side of the stack can feed reactants to the cells through respective passages 26.

The fuel cell 10 comprises two electrodes, namely; an anode 18 and a cathode 20 which are separated by a means to draw and distribute electrolyte such as an electrolyte matrix assembly 22. Each electrode abuts a reactant distribution plate 24. The top of the cell in FIG. 1, having grooves to bring in and distribute only one reactant since it is at the end of the stack, has a termination plate 24. The plates 24 on the other side of the cell depicted are part of a bi-polar assembly made up of two gas distribution plates 24 in back-to-back position to supply reactants to the cell shown and the adjacent cell not shown. Plates 24, the termination plate and the bi-polar assembly, have passages 26 for the entry of fluidic or gaseous reactants and elimination of any residual gases. Each electrode comprises a hydrophobic substrate layer 28 and a catalyst 30. The plates 24 of the cell 10A provide a series interconnection of the two cells. The means to draw and distribute electrolyte in the cell can be of any suitable type. For instance, it can be a material having pores therein of a particular size to draw and distribute the electrolyte. Alternatively, it can be a material made from two or more layers of different size pores, such as that shown in FIG. 1.

The matrix assembly 22 comprises a central permeable layer 32 of fibrous carbon sheet material having relatively large pores, the central layer 32 being positioned between two outside permeable layers 34 with pores which are smaller than the pores of the central layer 34. An electrolyte, typically phosphoric acid, is contained in the central layer 32. The pores of the central layer 32 are sufficiently large to permit the electrolyte to freely migrate through the central layer 32 so as to replenish the electrolyte within the cell 10 as may be required. The central layer 32 need not necessarily be completely filled with the electrolyte, it being necessary only to provide sufficient electrolyte to insure ionic conductivity between the electrodes 18 and 20.

The smaller pores of the outside layers 34 exert a strong capillary force which draws in the electrolyte from the central layer 32 to completely fill each of the outside layers 34. Layers 34 have a fast rate of uptake of electrolyte contained in the large pore layer 32 as needed. By providing adequate electrolyte to layers 34, each outside layer 34 serves as a barrier against the flow of reactant gas into the matrix assembly area. Thus, electrolyte is found in each of the three layers of the matrix assembly 22 to provide ionic conductivity to the matrix assembly 22, the matrix assembly 22 with the electrolyte therein serving as a path by which positive hydrogen ions can migrate via ionic current transport from the anode 18 to the cathode 20.

The outer layers 34 of the matrix assembly 22 have silicon carbide powder bonded with PTFE particles for increased hydrophilic properties to further insure that the layers 34 serve as gas barriers. In contrast, the hydrophobic layers 28 are impregnated with PTFE on the base material of the fibrous carbon to produce the hydrophobic characteristics. The porosity of the hydrophobic layer 28 is characterized by large pores through which the gaseous reactants can freely circulate so as to propagate from the passages 26 to the catalyst 30. Thus, the catalyst 30 is surrounded by a hydrophobic layer facing the gaseous reactants and the hydrophilic layer facing the electrolyte.

The hydrophobic layer 28 in each electrode is impregnated with Teflon to prevent the electrolyte from flooding into the electrode. This is an advantageous feature in the construction of the cell since such flooding would reduce the number of open pores through which the gaseous reactants must pass in the electrodes.

A reduced number of available pores would result in a diminution in the capacity of the cell to produce electricity.

The hydrophobic layer 28 brings the gaseous reactant into contact with the catalyst 30 while the hydrophilic layer 34 brings the electrolyte into contact with the catalyst 30. Thereby, respective electrochemical reactions can take place at the catalyst 30 of the anode 18 and at the catalyst 30 of the electrode 20. The catalyst 30 is conveniently formed of a precious metal such as platinum, with or without other metals which, under bonding and partial wet-proofing, is deposited on the hydrophobic layer 34. The same construction is utilized in each of the electrodes 18 and 20. It is noted that both the hydrophobic layer 28, the plate 24 and the electrodes 18 and 20 are electrically conducting. Thus, in the case of the anode 18, electrons released by the electrochemical reaction can propagate from the catalyst 30 through the fibrous carbon of the hydrophobic layer 28 and into the partitions or ribs 36 of the plate 24 which separate the respective passages 26.

In the series arrangement depicted in FIG. 1, the electrons from the anode of one cell are conducted directly into the cathode of the adjoining cell so as to migrate through the entire stack. An exemplary stack termination contact 38 is shown attached by conventional methods to the plate 24 of the anode 18. The contact 38 is coupled to an external circuit 40 (indicated in block diagrammatic form) while the other terminal of the external circuit 40 is coupled to a similar contact (not shown) at the opposite end of the stack of the fuel cells. The electrons can thereby, make a complete circuit from the negative terminal of the stack (the last of the anodes) via the external circuit 40 to the positive terminal of the stack (the first of the cathodes). Correspondingly, the hydrogen ions can migrate in each cell through the electrolyte contained in the matrix assembly proceeding from the anode of the cell through the cell to the cathode of the cell.

In operation, hydrogen is admitted through the manifold 12 to the passages 26 in the anodes 18 of each of the cells in the stack. Oxygen is admitted through the manifold 14 into the passages 26 of the cathodes 20 in each of the cells of the stack. Electrolyte is applied via the set of conduits 16 to make contact with the central layers 34 of the membranes 22 in the respective fuel cells of the stack. By capillary action, the electrolyte is brought into contact with the catalyst 30 in each of the electrodes 18 and 20. The hydrogen propagates from the passages 26 through the pores of the hydrophobic layer 28 to the catalyst 30 in the anode 18. The oxygen propagates from the passages 26 through the hydrophobic layer 28 to the catalyst 30 in the cathode 20. Thereby, the hydrogen and the electrolyte are placed in contact with each other at the interface of the catalyst 30 at the anode 18 and the oxygen and the electrolyte are placed in contact with each other at the interface of the catalyst 30 of the cathode 20 to provide for the respective electrochemical reactions at the anode 18 and the cathode 20. It is in these locations of the cell that the respective electrochemical reactions to produce electricity occur.

In accordance with a feature of the invention, the matrix assembly 22 is continuously in contact with electrolyte brought in by the set of conduits 16 from an external reservoir (not shown in FIG. 1) of such electrolyte. This insures that the cell 10 is always filled with the requisite amount of electrolyte even in the presence of losses of electrolyte which may occur during operation of the cell 10. Losses of electrolyte in the region between the electrodes may occur during the operation of the cell 10, and if not compensated for, can cause a reduction in the cell's output of electricity. Thereby, frequent shutdowns of the cell stack are not required to maintain the proper level of electrolyte in the outer layers 34 of the cells.

The central layer 32 is advantageously fabricated of a filamentary carbon paper manufactured by the Kureha Chemical Industry Company of Tokyo, Japan. The paper is composed of chopped carbon fiber produced from pitch and residual charred carbon of phenolic resin. The fine diameter filaments average 3 mm. (millimeters) in length and bonded together to form a uniformly thin web. The paper can be approximately 0.003 to 0.020 inches thick, preferably being approximately 0.009 to 0.011 inches thick, and is readily reduced in thickness under compression. The term "large pore" means pores approximately 50–300 microns in size while the term "small pore" means pores approximately 1–10 microns in size. During assembly of the cell 10, the layers thereof are compressed in sandwich-like form under a pressure of 30 to 50 lbs. per square inch.

The outer layers 34 are Teflon-bonded silicon carbide. The silicon carbide is mixed with a suspension of Teflon and an inking vehicle such as polyethylene oxide. The mixture is applied to the catalyst side of the electrode and then smoothed such as by a blade. The mixture is dried and sintered. The electrolyte is then added to the layers during assembly of the cell.

The above described process produces a material having a small pore size in the ranges desired. Any suitable material can be used for layers 34. For instance, the material can be made from inert, solid, inorganic, porous particles bonded with an inert coagulated fluorocarbon polymer in the form of a network structure, and a free concentrated acid electrolyte entrapped in said network, wherein the inorganic particles are a compound which is a member of the group consisting of an oxide, sulfate and phosphate of at least one of the metals zirconium, tantalum, tungsten, chromium, and niobium as described in U.S. Pat. No. 3,453,149. This patent is incorporated herein in its entirety by reference.

Further details on the construction of the respective layers of the cell 10 are well known, and are described, by way of example, in the foregoing U.S. Pat. Nos. 3,453,149, 4,064,322 and 4,175,165. These patents describe the construction of cells utilizing porous metal catalysts. The multiple porosity characteristic of the matrix assembly 22 provides for both the hydrophilic properties of the outer layers 34 while utilizing the larger pores of the central layer 32 for holding, moving and distributing the electrolyte so as to maintain the electrolytic saturation of the outer layers 34 during operation of the cell 10. In addition, the presence of the electrolyte in all three layers of the matrix assembly 22 provides the requisite conduction path for the hydrogen ions. Thus, the matrix assembly 22 of the invention permits the cell 10 to operate normally while maintaining the uniform distribution and the proper level of electrolyte therein.

As shown diagrammatically in FIG. 2, the cell 10 is part of a stack 50 of such cells. Also indicated diagrammatically in FIG. 2 are other components of the fuel cell 10; the plates 24 which distribute the gaseous reactants about the electrodes 18 and the central layer 32 of the matrix assembly 22 which serves as a means to draw and distribute electrolyte.

In accordance with the invention, the electrolyte distribution system 52 supplies electrolyte to each cell of the stack 50. The system 52 includes a set of metering cups 54 coupled individually to respective ones of the cell 10 by the conduits 16. Each conduit 16 is a flexible tube. An end of a conduit 16 is secured in a cell 10 at the layer 32 with the aid of a gasket (not shown in FIG. 2) for guiding the electrolyte from the conduit 16 into the layer 32 for transport throughout the region between the electrodes 18. Alternatively, one cup can serve a suitably small number of cells in a stack. Assuming the electrolyte to be the afore mentioned phosphoric acid, the acid can be dispensed to the respective cups by any suitable means (not shown) through which the acid is elevated from a reservoir (not shown). For instance, a source of air pressure can act through a conventional solenoid valve upon the surface of the acid in the reservoir. Pressure on the surface of the acid in the reservoir drives the acid into the passageway or cylinder 82, and then upwards through the cylinder 82 to provide a column of acid which pours into the cups 54 and temporarily inundates the cups. After the filling of the cups, the air pressure is released and the column of acid drops back to its former level in the reservoir.

In accordance with a feature of the invention, the separation of the stored amounts of electrolyte in the respective cups 54 during the transport along the conduits 16 provides for electrical isolation of the electrolyte of the respective cells 10. Such electrical isolation prevents the generation of shunt electric currents among various ones of the cells 10 in the stack 50. Shunt currents are likely to develop in the event that there was a connection by means of electrolyte from one fuel cell to the next fuel cell. By separating the electrolyte of each of the cells 10, the cells are able to operate independently of each other. Accordingly, in a series arrangement for the development of substantial voltage, the cells can operate without danger of a short or shunt current developing.

An alternate embodiment of the construction of the system 52 is shown in FIGS. 5–8. The manifold 16 (shown diagrammatically in FIG. 1) comprises a central chamber 68 containing the cups 50 which are connected by a system 70 of passages to an inlet port 72. The individual cups 54 connect to the tube 16 for conveying the electrolyte to the respective cells 10. Electrolyte entering through the inlet port 72 enters into the cups 54 and overflows from some of these cups 54 by the passage system 70 to enter other ones of the cups 54. Thereby, the electrolyte in each of the cups 54 is electrically isolated from the electrolyte of the other cups.

A storage and delivery system feeds electrolyte to a set of fuel cells, each of which is constructed as is the fuel cell 10 of FIG. 1. The cells are generally arranged in a stack 50 as portrayed diagrammatically in FIG. 2. In accordance with the invention, the storage and delivery system 52 includes a set of the conduits 16 (FIG. 1), each of which comprises a tube 76, having wicking fibers 78 therein. Electrolyte is drawn by capillary action through the wicking fibers 78.

Connection of the end of a conduit 16 to an individual fuel cell, such as the cell 10, can be accomplished by extending the fibers 78 beyond the end of the tube 76 (shown in FIG. 3) to contact the layer 32 with the aid of a seal 84 (shown in FIG. 4). The selection of fibers should be limited to materials that will have the requisite endurance in a fuel cell environment. Specifically, they should be corrosion resistant to hot, concentrated electrolyte. One such material is graphite fibers which have good resistance to corrosion and high temperatures. Preferably, the fibers 78 are made of carbon and the tube 76 is made of a heat shrinkable plastic. The plastic of the tube 76 is heat shrunk after insertion of the fiber 78 so as to tightly hold the fibers together to mechanically add strength to the fibers. The plastic should also be resistant to hot electrolyte and high temperatures, such as those in the 400° F. range. A good tube material is one made of heat shrinkable Teflon, for example.

A suitable material for the tube is "TFE Shrinkable Tubing" supplied by Chemplast Corporation, under the designation "2 X 1 TW (Thin-wall, 2X Shrinkable)". The inside diameter of this tubing is approximately 0.093 inches and the wall thickness is approximately 0.009 inches. After heat treatment, the inside diameter shrinks to approximately 0.061 inches and the wall thickness will change to approximately 0.012 inches. A suitable material for the carbon fibers used in the tube is "Quicksorb 200 Series" supplied by Takeda Chemical Industries, Ltd. International Div., of Tokyo, Japan. The fibers are supplied in a yarn form and have 1,050–1,550 $m^2/g$ (BET) specific surface area which consists mostly of pores smaller than 300 Å diameter and a 0.4–0.6 cc/g pore volume. It is preferable to have a tight fit between the yarn and tube inside diameter and to avoid crimping the tube. It is also preferrable to have a uniform cross section in the fibers when they are placed in the tube. The presence of the fibrous yarn in the tube provides an electrolyte demand flow system; that is, as electrolyte is needed in the cell, it will flow from the reservoir through the tube to the cell.

Figure 9:
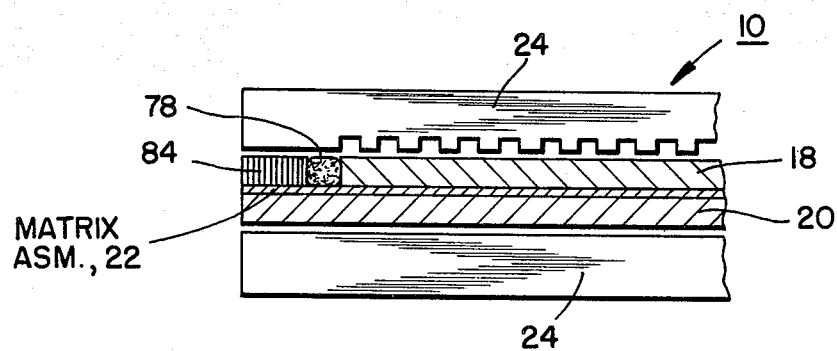
FIG. 9 is a sectional view of an alternative embodiment of the electrolyte feeding means.
Figure 10:
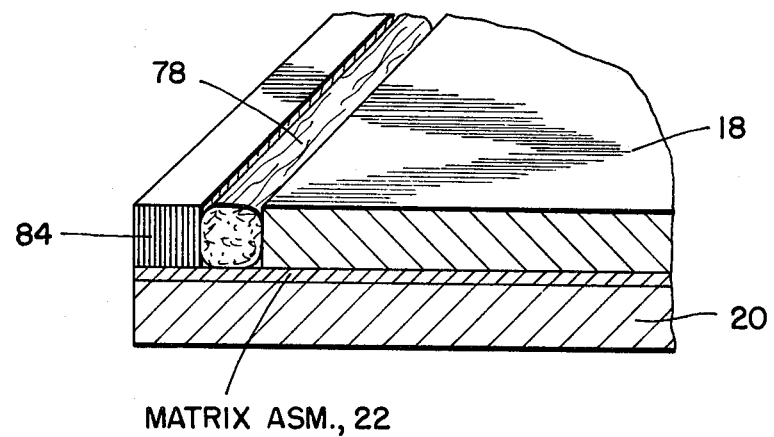
FIG. 10 is an isometric view of the embodiment in FIG. 9.

In operation, electrolyte is transported by the conduit 16 of the system 52 by capillary action to enter fuel cells of a stack. By use of fuel cells constructed in accordance with the structure of FIG. 1, the central layer 32 of the matrix assembly 22 draws electrolyte by capillary forces into the space between the electrodes 18 and 20. The hydrophilic layer 34 of the matrix assembly 22 draws electrolyte from the central layer 32; and, thereby, creates space for more electrolyte which is provided by the movement of electrolyte down the conduits 16. When using a material having a single pore size, it can be joined to the cell in a manner shown in FIGS. 9 and 10. In this embodiment the wick in the tube 76 (FIG. 3) extends into the cell and along the width of the cell or substantially across the cell adjacent and on the electrolyte matrix assembly 22 in the cell. The wick portion in the cell can be compressed between the reactant distribution plate and matrix assembly or layer 22 during cell assembly. This arrangement provides contact between the wick 78 and the matrix layer 22 over a large area and assists distribution of electrolyte throughout the matrix layer 22 area. It also eliminates the necessity of a dual porosity matrix assembly.

It is recognized that the rate of delivery of the electrolyte into a fuel cell 10 may depend on the amount of hydrostatic pressure resulting from the difference in elevation between the top of the electrolyte at the cup or the trough 54 and at the cell 10. The troughs 54 are arranged with increasing height corresponding to the increasing height of the successive cells in the stack. In addition, the troughs 54 are filled to the brim so that the hydrostatic pressures developed within the individual troughs 54 are maintained at the requisite amounts.

Thereby, the fuel cells are filled with the requisite amounts of electrolyte without danger of overfilling.

It is to be understood that the above-described embodiment of the invention is illustrative only and that modifications thereof may occur to those skilled in the art. Accordingly, this invention is not to be regarded as limited to the embodiment as disclosed herein, but is to be limited only as defined by the appended claims.

What is claimed is:

1. A system for supplying electrolyte to fuel cells in a stack of fuel cells comprising:
   (a) means for storing electrolyte externally to said fuel cells, an individual one of said cells including an electrolyte matrix means for drawing electrolyte;
   (b) means for conducting electrolyte from said storing means to the electrolyte matrix means in each of said cells, said conducting means including a wicking medium; and
   (c) means for maintaining a predetermined hydrostatic pressure of electrolyte at said conducting means.

2. A system according to claim 1 wherein said storing means stores electrolyte separately for each of said fuel cells of said stack and wherein said system is configured to provide electrical isolation among the separately stored electrolytes for each of said cells.

3. A system according to claim 2 wherein said storing means is in the form of a set of troughs having open mouths, each of said troughs being filled by applying electrolyte through its mouth until the trough overflows so as to maintain a predetermined depth and hydrostatic pressure within the storing means.

4. A system according to claim 3 wherein said conducting means comprises a set of tubes having wicking fibers therein, each of said tubes being coupled from individual compartments of said storing means to respective ones of said fuel cells.

5. A system according to claim 4 wherein said tubes are fabricated of heat shrinkable plastic and said fibers are of carbon, said plastic of said tubes being heat shrunk after insertion of said fibers therein to tightly bind said particles together.

6. The system according to claim 4 wherein said wicking fibers comprise graphite fibers.

7. The system according to claim 1 wherein said storing means stores electrolyte for a group of two or more of said fuel cells in said stack.

8. The system according to claim 7 wherein said storing means stores electrolyte separately for each of said groups of fuel cells and wherein said system is configured to provide electrical isolation among the separately stored electrolytes for each of said group.

9. A system according to claims 2 or 7 wherein the fuel cells in the stack have electrodes at which electrochemical reactions take place between fluidic reactants and the electrolyte and wherein the electrolyte matrix means comprises:
   (a) first and second permeable layers arranged in a laminated format, at least one of which is electrically insulating;
   (b) said first layer having relatively large pores for providing electrolyte in an ion conducting path between said electrodes; and
   (c) said second layer having relatively small pores for drawing electrolyte from said first layer, said second layer being positioned contiguous to an interaction surface of one of said electrodes for supplying electrolyte to the electro-chemical reaction at said one electrode.

10. A system according to claim 9 wherein said electrolyte supporting structure comprises a third permeable layer arranged in a laminated format with said first and said second layers, said third layer having relatively small pores as compared to the pores of said first layer for drawing.

11. A system according to claims 1 or 4 wherein said wicking medium extends into and substantially across the electrolyte matrix means so as to distribute electrolyte directly to a larger portion of said matrix.

12. A system for supplying electrolyte to fuel cells in a stack of fuel cells comprising:
   (a) means for storing electrolyte externally to said fuel cells, an individual one of said cells including an electrolyte matrix means for drawing electrolyte; and
   (b) means for conducting electrolyte from said storing means to the electrolyte matrix means in each of said cells said conducting means including a wicking medium.

* * * * *

UNITED STATES PATENT AND TRADEMARK OFFICE
CERTIFICATE OF CORRECTION

PATENT NO. : 4,463,068

DATED : July 31, 1984

INVENTOR(S) : J. G. Cohn, H. Feigenbaum, A. Kaufman

It is certified that error appears in the above—identified patent and that said Letters Patent is hereby corrected as shown below:

In Column 1, line 7, after "DEN3-241" please add --awarded by the U.S. Department of Energy.--

Signed and Sealed this

Third Day of January, 1989

Attest:

DONALD J. QUIGG

Attesting Officer       Commissioner of Patents and Trademarks